United States Patent [19]

Tanaka et al.

[11] 4,157,892
[45] Jun. 12, 1979

[54] METHOD OF COLORING WATER-ABSORBABLE PLASTICS AND COLORED WATER-ABSORBABLE PLASTICS

[75] Inventors: Kyoichi Tanaka; Takeshi Mio; Kozo Takahashi; Toshiharu Yoshikawa, all of Nagoya, Japan

[73] Assignee: Toyo Contact Lens Company, Limited, Nagoya, Japan

[21] Appl. No.: 731,572

[22] Filed: Oct. 12, 1976

Related U.S. Application Data

[63] Continuation of Ser. No. 443,948, Feb. 20, 1974, abandoned.

[30] Foreign Application Priority Data

Feb. 21, 1973 [JP] Japan ............................ 48/21470

[51] Int. Cl.$^2$ .................... B29D 11/00; D06P 3/00; G02C 7/04
[52] U.S. Cl. .................................... 8/14; 8/4; 8/17; 8/DIG. 7; 96/49; 96/91 R; 264/1; 351/162
[58] Field of Search ............... 8/4, 14, DIG. 7, 17; 96/49, 91 R; 351/162; 264/1

[56] References Cited

U.S. PATENT DOCUMENTS

| | | | |
|---|---|---|---|
| 1,500,844 | 7/1924 | Plauson | 8/DIG. 7 |
| 2,397,866 | 8/1946 | McQueen | 96/91 R |
| 2,415,382 | 2/1947 | Woodward | 96/91 R |
| 2,423,460 | 7/1947 | McQueen | 96/91 R |
| 2,477,462 | 7/1949 | McQueen | 96/91 R |
| 3,008,858 | 11/1961 | Blake et al. | 8/4 |
| 3,304,297 | 2/1967 | Wegmann et al. | 8/DIG. 7 |
| 3,344,098 | 9/1967 | Horiguchi et al. | 8/4 |
| 3,467,642 | 9/1969 | Horiguchi et al. | 8/4 |
| 3,476,499 | 11/1969 | Wichterle | 8/4 |
| 3,519,462 | 7/1970 | Bristol et al. | 351/162 |
| 3,682,635 | 8/1972 | Van Besauw et al. | 96/49 |
| 3,813,447 | 5/1974 | Tanaka et al. | 260/63 UY |
| 3,830,626 | 8/1974 | Rosenberger | 8/14 |
| 3,844,787 | 10/1974 | Ulrich et al. | 96/49 |
| 3,847,542 | 11/1974 | Harper et al. | 8/66 |
| 3,854,946 | 12/1974 | Sayigh et al. | 96/91 N |
| 3,890,148 | 6/1975 | Lawson et al. | 96/41 |
| 3,976,491 | 8/1976 | Desjarlais | 96/91 R |

OTHER PUBLICATIONS

Chemistry and Industry, Mar. 31, 1962, pp. 572–575.

*Primary Examiner*—Ronald W. Griffin
*Attorney, Agent, or Firm*—Kurt S. Myers

[57] ABSTRACT

A method of coloring a water-absorbable plastic partially or totally in a single color or multiple colors in such a manner that no migration or separation of the coloring agents used can take place. A copolymer of a coupler monomer and a water-absorbable plastic monomer, a polymer of a coupler polymer and a water-absorbable plastic monomer or a polymer of a coupler monomer and a water-absorbable plastic polymer is formed into an intermediate product shaped in the form of any desired final product. The intermediate product is immersed in an aqueous solution of a developer consisting of a diazonium double salt and allowed to swell, whereby the diazo-component of the developer penetrates into the plastic. The swollen product is then immersed in an aqueous acid or alkaline solution having an optimum pH value for coupling reaction to allow formation of an azoic dye on the plastic as a result of the coupling reaction. A partially colored plastic is produced by application of ultraviolet rays to a portion or portions of the plastic on which no coloring is required, whereby the diazo-component on those portions is decomposed to leave those portions uncolored. Multiple coloring is effected by repeating the partial coloring process by changing diazonium double salts.

26 Claims, No Drawings

METHOD OF COLORING WATER-ABSORBABLE PLASTICS AND COLORED WATER-ABSORBABLE PLASTICS

This is a continuation of application Ser. No. 443,948, filed Feb. 20, 1974, now abandoned.

BACKGROUND OF THE INVENTION

This invention relates to a method of coloring a water-absorbable plastic by using a coupler and a diazonium double salt which develops a color on the plastic.

Known methods of coloring plastics include the following:

A. A suitable dye or pigment is dispersed or dissolved in a monomer, and the monomer is polymerized to obtain a colored plastic. This method is featured by dispersion of a coloring agent in a plastic.

B. A suitable dye or pigment is mixed and dispersed in pellets or resin, which are then mixed with a suitable plastic to produce a colored plastic. This method is also featured by dispersion of a coloring agent in a plastic.

C. A solution of a suitable dye or pigment is obtained by dissolving the dye or pigment in a suitable solvent, and a plastic is immersed in the solution, whereby the dye or pigment permeates into the plastic and a colored plastic is obtained. This method is also featured by dispersion of a coloring agent in a plastic.

D. A plastic is colored by printing, transfer or coating. This method is featured by coloring a plastic by causing a coloring agent to adhere to the surface of the plastic.

It will be observed that according to any of the above methods 'A', 'B' and 'C', a coloring agent is simply dispersed in a plastic without any chemical reaction therewith. Thus, if any of the methods 'A', 'B' and 'C' is employed to color a water-absorbable plastic, it is impossible to obtain a satisfactorily colored plastic because water entering the plastic causes the migration of a coloring agent within the plastic, and also because water leaving the plastic causes the migration of the coloring agent out of the plastic. All the methods 'A', 'B' and 'C' have a further disadvantage when used for coloring a water-absorbable plastic, because those methods present difficulty in partial or multiple coloring of a water-absorbable plastic. The method 'D' may be used for partial or multiple coloring of a plastic, but cannot be employed satisfactorily for coloring a water-absorbable plastic. If a water-absorbable plastic colored by the method 'D' is immersed in water, the plastic swells, but the layer of the coloring agent applied on the surface of the plastic cannot swell so much as the plastic itself does. As a consequence, the coloring agent scales off the plastic surface.

SUMMARY OF THE INVENTION

It is an object of this invention to provide a method of coloring a water-absorbable plastic in such a manner that no migration of the coloring agent employed may occur.

It is another object of this invention to provide a partial or multi-color coloring method for a water-absorbable plastic by effecting the ultraviolet photolysis of a color developing substance or substances.

It is still another object of this invention to provide a method of producing easily a water-absorbable plastic product of a desired shape colored in a desired pattern in such a manner that no migration of the coloring agent or agents employed man occur.

The method of this invention essentially comprises combining a coupler with a high polymer constituting a water-absorbable plastic so that the coupler may form branches for the high polymer, causing a diazonium component to permeate into the water-absorbable plastic containing the coupler, and then immersing the plastic in an acid or alkaline aqueous solution having a pH value which is optimum for coupling reaction, to produce an azoic dye and thereby color the water-absorbable plastic. The method of this invention is superior to any known method of coloring a plastic, because it can successfully produce a colored water-absorbable plastic which can be kept in water for a lone time or boiled for sterilization or other puposes without any migration of a color developing agent. According to this invention, there can be produced a colored water-absorbable plastic in which there is no movement of the coloring agent or from which no coloring agent flows out. Therefore, the colored water-absorbable plastics produced by the method of this invention are very suitable for production of contact lenses or any other products that may be directly applied to the human body.

The diazonium component contained in the water-absorbable plastic produced according to this invention can easily be broken down under the influence of ultraviolet rays into substances incapable of coupling reaction. This feature makes it possible to produce according to this invention water-absorbable plastic products on which very small letters or symbols are reproduced. Other objects and advantages of this invention will become apparent from the following detailed description.

DETAILED DESCRIPTION

The method of coloring a water-absorbable plastic according to this invention comprises the following four steps:

1. Manufacture of a coupler monomer and a coupler polymer.

A polymerization radical is introduced into a coupler agent to obtain a polymerizable coupler monomer, from which a coupler polymer is manufactured. The coupler may be used either in the form of a monomer or a polymer.

2. Manufacture of a water-absorbable plastic capable of developing a color.

Either of the couplers obtained in the step 1 is copolymerized or polymerized with a water-absorbable plastic in the form of a monomer or a polymer in the presence of a polymerization initiator to produce a water-absorbable plastic capable of developing a color.

The following three combinations would be available;

(1) A copolymer of a coupler in the form of a monomer and a water-absorbable plastic in the form of a monomer.

(2) A polymer of a coupler in the form of a polymer and a water-absorbable plastic in the form of a monomer.

(3) A polymer of a coupler in the form of a monomer and a water-absorbable plastic in the form of a polymer.

The optimum amount of the coupler would be in the range of 0.01 to 5.00 parts by weight, whether it is used in the form of a monomer or a polymer.

3. Manufacture of an intermediate product.

One of the copolymer and the polymers obtained in the step 2 is selected and formed by cutting or otherwise into an intermediate product having the same dimensions as those of a desired final product, for example, a water-absorbable soft contact lens.

4. Development of a color on the intermediate product.

The intermediate product obtained in the step 3 is colored by one of the following methods which depend upon the color develpment required on the final product:

A. If it is desired to color the entire surface of the intermediate product, the intermediate product is immersed in an aqueous solution of a suitable diazonium double salt which acts as a developer. The immsersion is continued for a length of time required to cause the swelling of the intermediate product to thereby allow the diazo-component to permeate into the plastic. The pH value of the solution may be controlled to inhibit any precoupling reaction, if necessary. Then, the solution is controlled to an optimum pH value for causing coupling reaction to take place to allow the azoic dye to develop its color on the final product. Alternatively, it is possible to immerse the intermediate product in a separate acid or alkaline aqueous solution controlled to an optimum pH value for coupling reaction to permit the azoic dye to develop its color on the product. The optimum pH value for the necessary coupling reaction would be in the range of 2 to 6 for an acid solution, and in the range of 8 to 11 for an alkaline solution.

B. In case it is desired to partially color the intermediate product, the intermediate product is immersed in an aqueous solution of a suitable diazonium double salt which acts as a developer, and an acid, such as boric acid, tartaric acid, oxalic acid and citric acid, which acts as a precoupling inhibitor. A suitable alkali may be used instead of an acid to prepare the solution, if necessary. The immersion is continued as long as may be necessary to cause the intermediate product to swell in order to allow the diazo-component to permeate into the plastic and thereby form an azoic dye in the plastic by coupling reaction. The product is then taken out from the solution, and ultraviolet rays are applied by means of, for example, a duplicator lamp to those portions of the plastic which are not to be colored, whereby the diazo-components on those portions are broken down. Then, the product is immersed in an acid or alkaline aqueous solution having an optimum pH value for coupling reaction to allow the azoic dye to develop its color on the remaining portions of the product which are to be colored.

C. In case it is desired to obtain a water-absorbable plastic product colored in multiple colors, the method 'B' is repeated by changing diazonium double salts depending upon the colors desired on the product.

Description will now be made how the present invention can prevent the migration of a coloring agent, how it can color a plastic, and how it is adapted for selective coloring, when the plastic is colored by the method 'A', 'B' or 'C' as hereinabove described.

(1) Prevention of Migration

The migration of the coloring agent used to color a water-absorbable plastic can be prevented by combining a coupler with the plastic in such a manner that the coupler may form branches for a high polymer constituting the plastic. A coupler in the form of a monomer is produced by introducing into a coupler material a monomer radical, such as a vinyl radical, an acryl radical and a methacryl radical, which can monomerize the coupler material.

| (i) Coupler material | (ii) Monomer radical | (iii) Coupler monomer |
|---|---|---|
| R—OH<br>|<br>H | (A) $CH_2=CH-R'$<br>(vinly radical) | $CH_2=CH-R''-OH$<br>|<br>H |
| R—OH<br>|<br>H | (B) $CH_2=CHCO-R'$<br>(acryl radical) | $CH_2=CHCO-R''-OH$<br>|<br>H |
| R—OH<br>|<br>H | (C) $CH_2=C(CH_3)CO-R'$<br>(methacryl radical) | $CH_2=C(CH_3)CO-R''-OH$<br>|<br>H |

(R : Aromatic residue)

(a) Coupler materials available

The coupler materials which may be used to carry out the method of this invention include carboxylic acids having an active methylene group, such as monoethyl malonate, acetoacetic acid and cyanoacetic acid, and naphthols and phenols having an amino or hydroxy radical on the end of its molecule, such as 3-hydroxy-2-naphthoic-(m-amino) anilide, 3-hydroxy-2-naphthoic-(β-hydroxyethyl) amide, 3-hydroxy-2-naphthoic{bis-(β-hydroxyethyl)} amide, 3,5-resorcylic-(β-hydroxyethyl) amide and 2,4-resorcyclic-(β-hydroxyethyl) amide.

(b) Formation of a monomeric coupler is effected by introducing a polymerizing radical in the form of vinyl ester into a coupler material by replacement reaction with vinyl acetate in case the coupler material is a carboxylic acid having an active methylene group. In case a naphthol or phenol having an amino or hydroxy radical is used as a coupler material, a polymerizing radical is introduced thereinto in the form of methacrylamide, acrylamide, methacrylester or acrylester by reacting the material with methacrylic chloride or acrylic chloride.

(c) A polymeric coupler is formed by polymerizing monomeric couplers having vinyl, methacryl, acryl or other polymerizing radicals.

(d) Water-absorbable plastic monomers which can be colored by the method of this invention include 2-hydroxyethylmethacrylate, 2-hydroxypropylmethacrylate and 2-hydroxyethylacrylate having a hydroxyl, methacrylic and acrylic acids having a carboxyl, N-methylolacrylamide having an amino group and a hydroxyl, and N-vinylpyrrolidone and acrylamide having an amino group. Vinyl acetate can also be utilized and is changed into a water-absorbable vinyl alcohol by hydrolysis after polymerization. A water-absorbable plastic polymer which can be colored by the method of this invention may be formed from each of the above monomers.

(e) A water-absorbable plastic monomer is utilized by copolymerization with a coupler monomer or by polymerization with a coupler polymer.

(f) A water-absorbable plastic polymer is utilized by graft polymerization with a coupler monomer.

(g) The copolymerization, polymerization or graft polymerization mentioned in (e) and (f) above is effected in the presence of heat, light or a suitable vinyl polymerization initator, such as peroxide and azo-compounds. In order to shorten the polymerization time, it is preferable to heat the plastic or apply ultraviolet rays to the plastic, in the presence of a polymerization initiator. The peroxides suitable as such a polymerization initiator include benzoyl peroxide, acetyl peroxide and stearoyl peroxide, and the azo-compounds suitable as such a polymerization initiator include N, N'-azobisisobutyronitrile.

One example of reactions which may take place between one of the couplers mentioned above and one of the water-absorbable plastics mentioned above is represented by the following formula:

Coupler monomer Water-absorbable plastic monomer

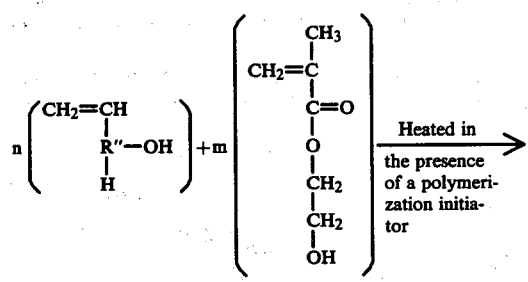

Water-absorbable plastic capable of being colored

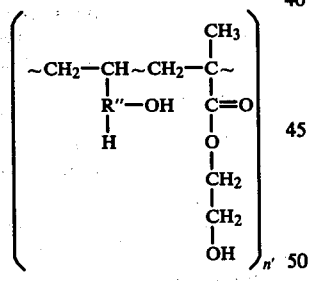

In conclusion, a coupler material forms a part of a high polymer constituting a water-absorbable plastic during the preparation of a water-absorbable plastic capable of being colored according to this invention. It will be observed that the azoic dye obtained by reaction with the diazo-component in the color developing is also chemically combined with the high polymer, and that no migration of the azoic dye can tale place unless decomposition of the plastic itself occurs.

(2) Color Development

Development of color on a water-absorbable plastic capable of being colored is effected by the coupler and the diazonium double salt at the branches of a high polymer constituting the plastic as represented by the following reaction:

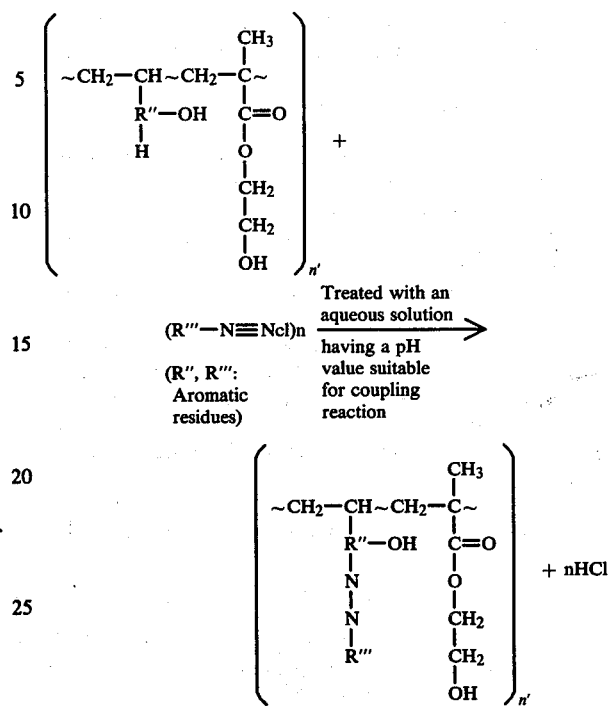

As is seen from the above formula, coupling reaction takes place between the coupler and the diazonium component when treated with an acid or alkaline aqueous solution having a suitable pH value, which is in the range of 2 to 6 in case of an acid solution and 8 to 11 in case of an alkaline solution, whereby an azoic dye is formed in the water-absorbable plastic to develop a desired color thereon.

(3) Selective Color Development

Selective or partial coloring of a water-absorbable plastic is effected by applying ultraviolet rays to those portions of the plastic which are not to be colored, whereby the diazonium components on those portions are broken down or decomposed to an extent incapable of coupling reaction, as represented by the following formula:

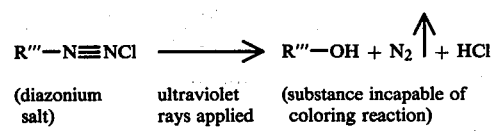

(diazonium salt)    ultraviolet rays applied    (substance incapable of coloring reaction)

The diazonium double salts which can be used for the total or partial coloring of a water-absorbable plastic according to this invention include the following:

(a) p-N,N'-dimethylamino benzene diazonium zinc chloride;

(b) p-N,N'-diethylamino benzene diazonium zinc chloride;

(c) 4-morpholino-2,5-dibutoxy benzene diazonium zinc chloride;

(d) p-N-ethyl-N'-hydroxyethylamino benzene diazonium zinc chloride;

(e) 4(p-methylbenzoylamino)-2,5-diethoxy benzene diazonium zinc chloride;

(f) 4(p-methylmercapto)-2,5-diethoxy benzene diazonium zinc chloride;

(g) 2,5-dichlorobenzene diazonium zinc chloride;

(h) 2-methoxy-5-nitrobenzene diazonium zinc chloride;

(i) 2-nitro-4-methoxybenzene diazonium zinc chloride;

(j) p-phenylaminobenzene diazonium zinc chloride;

(k) 2-chlorobenzene diazonium salt;

(l) 3-chlorobenzene diazonium salt;

(m) 4-benzoylamino-2-methoxy-5-methylbenzene diazonium salt; and (n) p-(4'-methoxyphenylamino)-benzene diazonium salt.

It will be noted that a photosensitive diazonium component contained in the salt used is easily decomposed by application of ultraviolet rays into a substance incapable of coupling reaction, so that selective or partial coloring may be easily accomplished according to this invention.

The invention will be described in further details by way of a few examples embodying the method of this invention.

EXAMPLE I

A coupler monomer, a water-absorbable plastic monomer and a polymerization initiator were prepared as shown in Table Ia and caused to undergo radical polymerization under the conditions shown in Table Ib, whereby a water-absorbable plastic capable of being colored was obtained. This plastic was formed into an intermediate product having the same shape as that of the desired final product. More specifically, a contact lens was made in this example.

Table 1a

| | Substances Used | Ratio |
|---|---|---|
| Coupler monomer | Ethylvinylmalonate (liquid) | 0.1 part by weight |
| Water-absorbable plastic monomer | 2-hydroxyethyl-methacrylate(liquid) | 100 parts by weight |
| Polymerization initiator | Azobisisobutylonitrile (crystalline) | 0.25 part by weight |

Table Ib

| | Reaction Conditions | | |
|---|---|---|---|
| | Primary Reaction | Secondary Reaction | Tertiary Reaction |
| Temperature | 40° C. | 60° C. | 80° C. |
| Time | 48 hours | 12 hours | 4 hours |

The contact lens thus made was immersed in a solution of the substances as shown in Table Ic below for about one hour to cause the lens to swell and allow the diazo-component contained in the solution to permeate into the lens. Then, the lens was taken out from the solution, and ultraviolet rays were applied to selected portions of the lens for about five minutes by using a duplicator lamp producing light having a maximum wavelength of 370 nm to cause the breakdown of the diazo-component in those selected portions.

Table Ic

| Composition of Solution in Which Lens Was Immersed | | |
|---|---|---|
| | Substances Used | Ratio |
| Photosensitive diazo- | 4-(p-methylbenzoyl- | 2.5 parts by |

Table Ic-continued

| Composition of Solution in Which Lens Was Immersed | | |
|---|---|---|
| | Substances Used | Ratio |
| nium double salt | amino)-2,5-diethoxy-benzene diazonium zinc chloride | weight |
| Precoupling inhibitor | Boric acid | 0.9 part by weight |
| Stabilizer | Aluminum chloride | 0.9 part by weight |
| Solvent | Water | 100 parts by weight |

The contact lens thus partially exposed to ultraviolet rays was immersed in an aqueous solution of sodium borate having a pH value of 9 to 10 to develop color on the unexposed portion of the lens. The immersion was continued for about ten minutes, and a partially colored water-absorbable soft contact lens was obtained. The lens portion exposed to ultraviolet rays was colorless and transparent, while the unexposed portion was yellow and transparent.

EXAMPLE II

The test of Example I was repeated except that 0.1 part by weight of 3-hydroxy-2-naphthoic-3'-methacrylamideanilide(solid) was used as a coupler monomer instead of ethylvinylmalonate, and a partially colored water-absorbable soft contact lens was obtained in which the portion exposed to ultraviolet rays was colorless and transparent, while the unexposed portion was violet and transparent.

Given below is the rational formula of 3-hydroxy-2-naohthoic-3'-methacrylamideanilide used in this example:

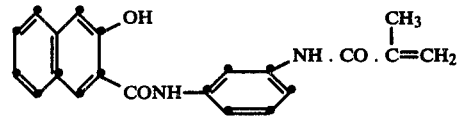

The coupler monomer used in this example was formed from a combination of 3-hydroxy-2-naphthoic-3'-aminoanilide and methacrylic chloride.

EXAMPLE III

The test of Example I was repeated, except that 3-hydroxy-2-naphthoic-3'-methacrylamideanilide was used as a coupler monomer, application of ultraviolet rays was omitted to produce totally colored contact lenses, and different types of diazonium double salts as shown in Table III were used to produce differently colored lenses:

Table III

| Diazonium double salts used | Color developed |
|---|---|
| 1. 2-chlorobenzene diazonium salt | Orange yellow |
| 2. 3-chlorobenzene diazonium salt | " |
| 3. 2-methoxy-5-nitrobenzene diazonium salt | Red |
| 4. 2-nitro-4-methoxybenzene diazonium salt | Reddish violet |
| 5. 4-benzoylamino-2-methoxy-5-methylbenzene diazonium salt | " |
| 6. p-(4'-methoxyphenylamino)-benzene diazonium salt | Violet |
| 7. p-phenylaminobenzene diazonium salt | Blue |

The partially colored water-absorbable soft contact lens obtained in Example I was boiled for 24 hours, and no migration of the coloring agent within the lens was observed, nor was any separation of the coloring agent from the lens. The lens of Example I was also kept in water at room temperature for a period of four months, and no migration or separation of the coloring agent was observed after the elaspe of the four months.

Tests were conducted by boiling to compare the partially colored contact lens of Example II with a conventionally printed partially colored soft contact lens with respect to the possibility of migration of coloring agent; To facilitate comparison, an appropriate symbol was dyed on each of the lenses, and changes of the symbols were ascertained by visual observation at certain intervals of time. Table IV shows the results of the tests.

Table IV

| | Comparison of Migration Resistance | | |
|---|---|---|---|
| | Boiling Time | | |
| | 30 min. | 1 hour | 48 hours |
| Lens colored according to this invention | No change was observed, but the symbol remained clear. | No change was observed, but the symbol remained clear. | The symbol was still quite clear, though the color became slightly lighter. |
| Conventionally colored lens | The symbol was found entirely out of shape due to migration. | The lens lost color due to separation of the coloring agent from the lens. | — |

Migration resistance tests were also conducted with respect to the totally colored lenses of different colors obtained in Example III, and all of those lenses showed a very satisfactory migration resistance or substantially no discoloration.

The following illustrates some examples of the products colored by the method of this invention;

(1) Totally or partially colored water-absorbable soft contact lenses, or water-absorbable soft contact lenses on which one or more letters, numerals, symbols or the like are marked by coloring, as detailed in the foregoing description;

(2) Colored water-absorbable plastic supports for artificial teeth;

(3) Multi-colored imitation flowers made of water-absorbable plastics and kept in water for ornamental purposes;

(4) Multi-colored baits made of Water-absorbable plastics;

(5) Colored surface layers made of water-absorbable plastics and applied to sunglasses to prevent the misting thereof.

While the invention has been described herein with reference to certain specific materials, procedures and examples, it is understood that the invention is not restricted to the particular materials, combinations of materials and procedures selected for the purpose of illustrations. Numerous variations of such details can be employed by those skilled in the art within the scope of this invention which is defined by the appended claims.

What is claimed is:

1. A method of making a colored water-absorbable soft contact lens comprising
    (a) preparing a water-absorbable soft contact lens substantially composed of a material selected from the group consisting of
        (i) a product of copolymerization between a coupler having a polymerization radical and a water-absorbable plastic monomer capable of forming a water-absorbable soft contact lens;
        (ii) a product of polymerization between a coupler having a polymerization radical and a polymer of a water-absorbable plastic monomer capable of forming a water-absorbable soft contact lens; and
        (iii) a product of polymerization between a polymer of a coupler having a polymerization radical and a water-absorbable plastic monomer capable of forming a water-absorbable soft contact lens; said water-absorbable plastic monomer being a member selected from the group consisting of 2-hydroxyethylmethacrylate, 2-hydroxypropylmethacrylate, 2-hydroxyethylacrylate, N-methylolacrylamide, methacrylic acid, acrylic acid, N-vinyl pyrrolidone, acrylamide and vinyl acetate which is changed into a water-absorbable vinyl alcohol by hydrolysis after polymerization, and
    (b) immersing said water-absorbable soft contact lens in an aqueous solution of a diazonium double salt having a pH value which is suitable for causing coupling reaction to form a azoic dye within said contact lens.

2. The method as defined in claim 1, wherein said coupler is a compound selected from the group consisting of vinyl esters of monoethylmalonate, acetoacetic acid and cyanoacetic acid having an active methylene group; acrylesters, methacryl esters, acryl amides and methacryl amides of 3-hydroxy-2-naphthoic-(m-amino) anilide, 3-hydroxy-2-naphthoic-($\beta$-hydroxyethyl) amide, 3-hydroxy2-naphthoic-{bis-($\beta$-hydroxyethyl)} amide, 3,5-resorcyclic($\beta$-hydroxyethyl) amide and 2,4-resorcyclic-($\beta$-hydroxyethyl) amide having an amino or hydroxy radical on the end of its molecule; and the polymers thereof.

3. The method as defined in claim 1, wherein said water-absorbable plastic monomer comprises at least one compound selected from the group consisting a 2-hydroxyethylmethacrylate; 2-hydroxypropylmethacrylate; 2-hydroxyethylacrylate; N-methylolacrylamide; N-vinylpyrrolidone; and acrylamide.

4. The method as defined in claim 1, wherein said water-absorbable plastic polymer is a composition selected from the group consisting of polyvinyl alchol and polyvinylpyrrolidone.

5. The method as defined in claim 1, wherein 100 parts by weight of each said product of copolymerization or polymerization contains about 0.01 to five parts by weight of said coupler or said polymer of said coupler.

6. The method as defined in claim 1, wherein said diazonium double salt is a compound selected from the group consisting of p-N,N'-dimethylaminobenzene diazonium zinc chloride; p-N,N'-diethylaminobenzene diazonium zinc chloride; 4-morpholino-2,5-dibutoxybenzene diazonium zinc chloride; p-N-ethyl-N'-hydroxyethylaminobenzene diazonium zinc chloride; 4-(p-methylbenzoylamino)-2,5-diethoxybenzene diazonium zinc chloride; 4(p-methylmercapto)-2,5-diethoxybenzene diazonium zinc chloride; 2,5-dichlorobenzene diazonium zinc chloride; 2-methoxy-5-nitrobenzene diazonium zinc chloride; 2-nitro-4-methoxybenzene diazonium zinc chloride; p-phenylaminobenzene diazonium zinc chloride; 2-chlorobenzene diazonium salt; 3-chlorobenzene diazonium salt; 4-benzoylamino-2- methoxy-5-methylbenzene diazonium salt; and p-(4'-methoxyphenylamino)-benzene diazonium salt.

7. A method of making a colored soft contact lens comprising:
(a) preparing a water-absorbable soft contact lens substantially composed of material selected from the group consisting of
  (i) a product of copolymerization between a coupler having a polymerization radical and a water-absorbable plastic monomer capable of forming a water-absorbable soft contact lens;
  (ii) a product of polymerization between a coupler having a polymerization radical and a polymer of a water-absorbable plastic monomer capable of forming a water-absorbable soft contact lens; and
  (iii) a product of polymerization between a polymer of a coupler having a polymerization radical and a water absorbable plastic monomer capable of forming a water-absorbable soft contact lens; said water-absorbable plastic monomer being a member selected from the group consisting of 2-hydroxyethylmethacrylate, 2-hydroxypropylmethacrylate, 2-hydroxyethylacrylate, N-methylolacrylamide, methacrylic acid, acrylic acid, N-vinyl pyrrolidone, acrylamide and vinyl acetate which is changed into a water-absorbable vinyl alchol by hydrolysis after polymerization;
(b) immersing said water-absorbable soft contact lens in an aqueous solution of a diazonium double salt having a pH value controlled to inhibit any precoupling reaction; and
(c) immersing said water-absorbable soft contact lens in an aqueous solution having a pH value which is suitable for causing coupling reaction to take place to form an azoic dye within said contact lens.

8. The method as defined in claim 7, wherein said coupler is a compound selected from the group consisting of vinyl esters of monoethylmalonate, acetoacetic acid and cyanoacetic acid having an active methylene group; acryl esters, methacryl esters, acryl amides and methacryl amides of 3-hydroxy-2-naphthoic-(m-amino) anilide, 3-hydroxy-2-naphthoic-($\beta$-hydroxyethyl) amide, 3-hydroxy-2-naphthoic-{bis-($\beta$-hydroxetyl)} amide, 3,5-resorcylic-($\beta$-hydroxyethyl) amide and 2,4-resorcylic-($\beta$-hydroxyethyl) amide having an amino or hydroxy radical on the end of its molecule; and the polymers thereof.

9. The method as defined in claim 7, wherein said water-absorbable plastic monomer comprises at least one compound selected from the group consisting of 2-hydroxyethylmethacrylate; 2-hydroxypropylmethacrylate; 2-hydroxyethylacrylate; N-methylolacrylamide; N-vinylpyrrolidone; and acrylamide.

10. The method as defined in claim 7, wherein said water-absorbable plastic polymer is a composition selected from the group consisting of polyvinyl alcohol and polyvinylpyrrolidone.

11. The method as defined in claim 7, wherein 100 parts by weight of each said product of copolymerization or polymerization contains about 0.01 to five parts by weight of said coupler or said polymer of said coupler.

12. The method as defined in claim 7, wherein said diazonium double salt is a compound selected from the group consisting of p-N,N'-dimethylaminobenzene diazonium zinc chloride; p-N,N'-diethylaminobenzene diazonium zinc chloride; 4-morpholino-2,5-dibutoxybenzene diazonium zinc chloride; p-N-ethyl-N'-hydroxyethylaminobenzene diazonium zinc chloride; 4(p-methylbenzoylamino)-2,5-diethoxybenzene diazonium zinc chloride; 4(p-methylmercapto)-2,5-diethoxybenzene diazonium zinc chloride; 2,5-dichlorobenzene diazonium zinc chloride; 2-methoxy-5-nitrobenzene diazonium zinc chloride; 2-nitro-4-methoxybenzene diazonium zinc chloride; p-phenylaminobenzene diazonium zinc chloride; 2-chlorobenzene diazonium salt; 3-chlorobenzene diazonium salt; 4-benzoylamino-2-methoxy-5-methylbenzene diazonium salt; and p-(4'-methoxyphenylamino)-benzene diazonium salt.

13. The method as defined in claim 7, wherein said aqueous solution of a diazonium double salt is an acid solution.

14. The method as defined in claim 7, wherein said aqueous solution of a diazonium double salt is an alkaline solution.

15. The method as defined in claim 7, wherein said aqueous solution having a pH value which is suitable for causing coupling reaction to take place is an alkaline solution.

16. The method as defined in claim 7, wherein said aqueous solution having a pH value which is suitable for causing coupling reaction to take place is an acid solution.

17. A method of making a partially colored water-absorbable soft contact lens comprising:
(a) preparing a water-absorbable soft contact lens substantially composed of a material selected from the group consisting of
  (i) a product of copolymerization between a coupler having a polymerization radical and a water-absorbable plastic monomer capable of forming a water-absorbable soft contact lens;
  (ii) a product of polymerization between a coupler having a polymerization radical and a polymer of a water-absorbable plastic monomer capable of forming a water-absorbable soft contact lens; and
  (iii) a product of polymerization between a polymer of a coupler having a polymerization radical and a water-absorbable monomer capable of forming a water-absorbable soft contact lens; said water-absorbable plastic monomer being a member selected from the group consisting of 2-hydroxyethylmethacrylate, 2-hydroxypropylmethacrylate, 2-hydroxyethylacrylate, N-methylolacrylamide, methacrylic acid, acrylic acid, N-vinyl pyrrolidone, acrylamide and vinyl acetate which is changed into a water-absorbable vinyl alcohol by hydrolysis after polymerization;
(b) immersing said water-absorbable soft contact lens in an aqueous solution of a sensitive diazonium double salt having a pH value controlled to inhibit any precoupling reaction;
(c) applying ultraviolet rays to less than all of said contact lens to resolve the diazonium double salt in said ultraviolet ray treated portion; and
(d) immersing water-absorbable soft contact lens in an aqueous solution having a pH value which is suitable for causing coupling reaction to form an azoic dye of a desired color in the remaining portion of said contact lens.

18. The method as defined in claim 17, wherein said coupler is a compound selected from the group consisting of vinyl esters of monoethylmalonate, acetoacetic acid and cyanoacetic acid having an active methylene group; acryl esters, methacryl esters, acryl amides and methacryl amides of 3-hydroxy-2-naphthoic-(m-amino) anilide, 3-hydroxy-2-naphthoic-($\beta$-hydroxyethyl) amide, 3-hydroxy-2-naphthoic-{bis-($\beta$-hydroxyethyl)} amide, 3,5-resorcylic-($\beta$-hydroxyethyl) amide and 2,4-resorcylic-($\beta$-hydroxyethyl) amide having an amino or hydroxy radical on the end of its molecule; and the polymers thereof.

19. The method as defined in claim 17, wherein said water-absorbable plastic monomer comprises at least one compound selected from the group consisting of 2-hydroxyethylmethacrylate; 2-hydroxypropylmethacrylate; 2-hydroxyethylacrylate; 2-hydroxypropylmethacrylate; 2-hydroxtyethylacrylate; N-methylolacrylamide; N-vinylpyrrolidone; and acrylamide.

20. The method as defined in claim 17, wherein said water-absorbable plastic polymer is a composition selected from the group consisting of polyvinyl alcohol and polyvinylpyrrolidone.

21. The method as defined in claim 17, wherein 100 parts by weight of each said product of copolymerization or polymerization contains about 0.01 to five parts by weight of said coupler or said polymer of said coupler.

22. The method as defined in claim 17, wherein said photosensitive diazonium double salt is a compound selected from the group consisting of p-N,N'-dimethylaminobenzene diazonium zinc chloride; p-N,N'-diethylaminobenzene diazonium zinc chloride; 4-morpholine-2,5-dibutoxybenzene diazonium zinc chloride; p-N-ethyl-N'-hydroxyethylaminobenzene diazonium zinc chloride; 4(p-methyl-benzoylamino)-2,5-diethoxybenzene diazonium zinc chloride; 4(p-methylmercapto)-2,5-diethoxybenzene diazonium zinc chloride; 2,5-dichlorobenzene diazonium zinc chloride; 2-methoxy-5-nitrobenzene diazonium zinc chloride; 2-nitro-4-methoxybenzene diazonium zinc chloride; p-phenylaminobenzene diazonium zinc chloride; 2-chlorobenzene diazonium salt; 3-chlorobenzene diazonium salt; 4-benzoylamino-2-methoxy-5-methylbenzene diazonium salt; and p-(4'-methoxyphenylamino)-benzene diazonium salt.

23. The method as defined in claim 17, wherein said aqueous solution of a diazonium double salt is an acid solution.

24. The method as defined in claim 17, wherein said aqueous solution of a diazonium double salt is an alkaline solution.

25. The method as defined in claim 17, wherein said aqueous solution having a pH value which is suitable for causing coupling reaction to take place is an alkaline solution.

26. The method as defined in claim 17, wherein said aqueous solution having a pH value which is suitable for causing coupling reaction to take place is an acid solution.

* * * * *